Patented June 27, 1939

2,163,622

UNITED STATES PATENT OFFICE 2,163,622

COMPOUNDED LUBRICATING OIL

George L. Neely and Frank W. Kavanagh, Berkeley, Calif., assignors to Standard Oil Company of California, San Francisco, Calif., a corporation of Delaware No Drawing. Application February 7, 1936, Serial No. 62,814

6 Claims. (Cl. 87—9)

This invention relates to compounded lubricating oils. More particularly it involves the provision of an all purpose crank case lubricating oil for internal combustion engines which will inhibit piston ring sticking, scoring, and uneven or undue wear of pistons, piston rings or cylinder walls, particularly of a new engine.

One important problem in lubrication of internal combustion engines arises from the partial decomposition of lubricating oils at high temperatures. Gums and carbon formed by such decomposition processes in an internal combustion engine are deposited on the piston and around the piston rings causing them to stick. When this occurs the engine must be overhauled with the consequent expense and undesirable loss of time. This problem has become very acute in the case of high speed Diesel engines in automotive or tractor service. For example, it has been found that in many instances after continuous operation of a farm tractor for approximately 100 to 200 hours, as is often done during the harvest season, the piston rings stick and a complete overhaul is necessary. Piston ring sticking also occasions great expense and is a material handicap in the operation of aircraft engines. The difficulty is also present in the modern high compression automobile gasoline engines but has not become so acute. The problem of inhibiting or preventing ring sticking has perplexed lubricating engineers for some time and its solution certainly has not been apparent or obvious. We have discovered a lubricant which is believed to solve the difficulty.

Another important property of a lubricating oil is the ability to properly lubricate tightly fitting surfaces and prevent undue or uneven wear. In this respect it is necessary, or at least highly desirable, to meet extreme requirements under actual operating conditions. For example, it is generally thought essential to break in a new engine by running at low speeds and light loads until parts are properly worn in. Such a "breaking-in" process is, however, not universally followed and serious damage to engines has resulted. Our invention materially reduces the risk of such damage in that it provides a lubricant which permits a new engine to be immediately run under normal operating conditions without damage and without previous "breaking-in." By permitting a new engine to be put in immediate use under normal loads and speeds our compounded lubricating oil affords a material saving to commercial operators. At the same time deposition of carbons and gums which might later cause troublesome ring sticking is prevented or materially inhibited.

Accordingly, it is an object of this invention to provide an all purpose internal combustion engine crank case lubricating oil highly efficient in preventing ring sticking and suitable for use as a "breaking-in" oil.

Another object is to provide a crank case lubricating oil which will insure against scoring or uneven wear of pistons, piston rings and cylinder walls of an engine under severe operating conditions.

An additional object of the invention is to provide a crank case lubricant which will permit continuous operation of automotive and tractor Diesel motors over long periods of time without danger from piston ring sticking.

A still further object of our invention is to provide a lubricating oil particularly useful where freedom from carbon and gum deposits and prevention of destructive wear of closely fitting parts are essential.

A still further purpose of our invention is to provide a method of compounding lubricating oils.

A still further object is to provide a method of adequately lubricating internal combustion engines under adverse operating conditions.

We have found that the above discussed objects may be attained by incorporating in a mineral lubricating oil small amounts of two types of ingredients. The first of these two ingredients is an oil-soluble metallic salt of petroleum naphthenic acids. The second ingredient is a fatty acid such as stearic or oleic acid.

Small amounts of these constituents suffice and the proportions may be varied depending upon the degree or extent of the effect desired. It has been found that from ½ to 1%, or approximately ¾ of 1% by weight of the naphthenic salts based on the amount of mineral oil is the minimum amount which will give practical and satisfactory results. The addition of 1% by weight of naphthenate based on the amount of the oil is at present regarded as the optimum proportion. The addition of more than 2% naphthenate is regarded as unnecessary. The maximum amount of naphthenic salt to be incorporated is limited by the permissible increase in viscosity and by the tendency to jell which is produced in the compounded oil by this constituent. The presence of free acids such as stearic or oleic acids, tends to break the viscosity increase and prevent the jelling effect due to the presence of the naphthenate. This method of minimizing those effects of the naphthenic salts which are regarded as undesirable without substantially interfering with the efficiency of this ingredient in other respects, is a valuable feature.

The quantity of fatty acids which is to be added may also be varied depending upon the extent of the effect desired. In general 0.1% by weight of the fatty acid based on the amount of the oil is regarded as the minimum amount necessary to produce commercially satisfactory results. Approximately 0.25% by weight based on the amount of the oil appears to be the optimum proportion of the fatty acid. The maximum amount permissible is determined by the corrosivity effects of this constituent. Large amounts of free fatty acids increase corrosivity of the oil for various metals to an unjustifiable extent without a corresponding increased benefit in lubricating effects. In view of this situation, it is obvious that the maximum quantity of fatty acid permissible may vary considerably depending upon the particular use and metals for which the compounded oil is intended. We regard addition of more than from 1 to 2% free acid as unjustifiable although not outside the broad scope of our invention.

To be operative for our purposes the metal naphthenate must be dispersible or soluble in mineral oil. We term such a dispersion a solution although we recognize that it may not be a true solution in the technical sense. We therefore desire it to be understood that the terms "oil soluble" or "solution" are used in a generic sense to include either true solutions or stable colloidal dispersions. Oil soluble metal naphthenates which we have found to be operative are aluminum, zinc, magnesium, cobalt, cadmium, manganese and tin naphthenates. The alkali metal and other water soluble naphthenates are generally less desirable because of the tendency to produce foaming in the crank case. Of the above mentioned metal naphthenates aluminum and manganese are particularly efficient for our purposes. The naphthenate which we at present prefer to use is a basic salt of petroleum naphthenic acids containing 2 equivalent weights of naphthenic acids and 3 equivalent weights (1 atom) of aluminum, rather than the 3 equivalent weights of acid required in a "normal" aluminum naphthenate. Such a basic aluminum naphthenate may be prepared by adding to a neutral aqueous sodium napthenate solution, a caustic alkali and a water soluble aluminum salt, in proportions of 1 equivalent weight of hydroxide (OH) per 3 equivalent weights of aluminum. The water insoluble basic aluminum naphthenate will be precipitated and the sodium will remain in solution.

An aluminum naphthenate in which less than 3 equivalent weights of the naphthenic acids are used for 3 equivalent weights of aluminum is probably a mixture of salts giving, for instance, an average proportion of 2 equivalent weights of naphthenic acid to 3 of aluminum and not merely a single salt. Various proportions of aluminum mono-naphthenate and aluminum di-naphthenate, together with the normal salt, may exist in heterogeneous mixtures in our compound. In any event such mixture may be considered a basic rather than a normal salt so long as there is present insufficient naphthenic acid to satisfy the normal valence of the metal. An aluminum naphthenate containing 2 equivalent weights of naphthenic acid to 3 of aluminum is termed aluminum di-naphthenate for simplicity of definition.

We prefer basic naphthenic salts to normal salts for the reason that lubricating oils containing them show rates of wear of lubricated motor parts and particularly bearings lower than that of lubricating oils containing normal salts.

Methods of preparing naphthenic acids suitable for our purposes are well known. Briefly, these acids are generally prepared by extracting the naturally occurring naphthenic acids from crude petroleum oils or other distillates containing them, usually by washing the said oils with dilute aqueous caustic soda solution whereby water soluble alkali naphthenates are formed. The alkali naphthenate solution may then be extracted with organic solvents to remove the larger proportion of inert mineral oil contained therein. Either the alkali naphthenate so obtained or the free naphthenic acids liberated therefrom are suitable for preparation of oil soluble salts as previously described. It should be noted that other methods of preparing naphthenic acids are known and that the characteristic feature which distinguishes naphthenic acids and their equivalents is the presence of a carbocyclic nucleus in the naphthenic acid molecule.

The fatty acid constituent of our oil must be soluble in mineral oil, or at least dispersible in mineral oil containing a naphthenate as contemplated by our invention. The fatty acid should also be selected with the fact in mind that corrosion due to chemical activity of the acid must be kept at a minimum. Higher fatty acids such as stearic and oleic have proved themselves to be suitable. Equivalent organic acids such as hydroxylated, hydrogenated or other fatty acid derivatives which are not unduly corrosive are contemplated as falling within the broad scope of our invention. By the term "indestructive" used in the claims, we intend to designate acids which do not cause abnormal wear or corrosion of motor parts. Acids within the scope of our invention need not be entirely free from corrosive effects but should be sufficiently free therefrom to permit their use in internal combustion engines without unduly adverse effects. It is apparent that acids which are unduly corrosive or destructive to some metals will be entirely suitable for others. It is therefore very difficult to designate precisely the acids to be used without knowing the conditions which they are to encounter or the metals intended to be lubricated. However, selection of fatty acids within the scope of the term "indestructive" is regarded as within proper scope of our invention and as involving mere experimentation. The term "higher fatty acids", as is generally understood by those skilled in the art, is used herein to designate those fatty acids of the fatty acid homologous series containing more than from approximately 8 to 10 carbon atoms.

It is apparent that the fatty acid may be incorporated in our oil as the free acid or may be added as a compound which dissociates or decomposes either immediately or during use to give the free acid. Furthermore, we do not wish to be bound by the theory that the free acid after addition to mineral oil remains in the free state.

For purposes of illustration and to enable preparation of a lubricating oil according to our invention without unnecessary experimentation, the following example is given. A basic aluminum naphthenate containing 2 equivalent weights of naphthenic acid to 3 equivalent weights of aluminum is obtained by any of the well known methods such as those previously described. Mineral oil concentrate is prepared by dissolving 10 parts by weight of the naphthenate and 90 parts by weight of the mineral oil. This concentrate is added to a mineral lubricating oil in quantities sufficient to give 1% by weight of naphthenate based on the completed oil. This oil is then heated for about 30 minutes at a temperature of 350° F. by indirect heat. If superheated steam is used for this heating operation a shorter time will generally suffice. After cooling, preferably to approximately atmospheric temperatures, the stearic acid is incorporated either in molten form or in an oil concentrate. The acid is added in a quantity sufficient to give 0.25% by weight of the acid based on the completed oil. The oil so compounded is then ready for use.

To emphasize the great utility of our compounded oil it is again pointed out that by using an oil, prepared as above, in the crank case of a Diesel engine it has been found that the engine can be run for several thousand hours without piston ring sticking or the necessity of overhauling the motor. With various mineral oil lubricants previously tried piston ring sticking occurred and an overhaul became imperative after a few hundred hours operation under the same conditions.

By the addition of both fatty acids and metallic naphthenates a compounded lubricating oil is obtained which, in addition to the above desirable property of preventing ring sticking, enables operation of a new engine under normal operating conditions without previous "breaking-in." With certain engines this cannot always be done with safety when the compounded oil contains aluminum di-naphthenate alone. Presumably it is the freedom from gum and carbon deposition on pistons, rings, valves, etc. combined wtih characteristics which prevent scoring and objectionable wear which insure against damage to the motor under such severe operating conditions.

We do not, however, rely upon any theoretical explanation of the action of our oil but regard the actual and unpredictable improvement in the operation of internal combustion engines as evidence of invention and our discovery of a compounded lubricating oil having unusual advantages and characteristics.

We have found that an oil containing both aluminum di-naphthenate and stearic acid gives an improved rate and uniformity of wear of piston rings and cylinders over that obtained by the use of aluminum di-naphthenate alone. A laboratory wear testing machine comprising a ½ inch steel ball pressed against a 1⅜ inch steel cylinder with a force of 40 pounds having a cylinder dipping in the oil to be tested and rotated at 600 R. P. M. for sixteen hours was used to compare relative wear rates. Tests with oil containing 1% aluminum di-naphthenate showed an average weight loss of the ball of 1.9 milligrams, whereas the average for the same oil containing both 1% aluminum di-naphthenate and ¼% stearic acid was only 0.4 milligram.

It has also been observed in several test runs of motors that the small amount of gum and/or carbonaceous material deposited after long periods of operation was softer and more easily removed than when aluminum di-naphthenate alone is used.

The tendency of the dissolved fatty acid to separate out or form a cloud at low temperatures is materialy inhibited by the presence of the naphthenate.

While we have described in detail the character of our invention and given an illustration of the preparation and application of the composition of our invention, we have done so by way of illustration only and with the intention that no limitation should be imposed upon the invention thereby. It will be obvious to those skilled in the art that numerous modifications and variations of the above illustrated example may be effected in the practice of our invention which is of the scope of the claims appended hereto.

We claim:

1. A lubricant comprising a mineral oil in which has been incorporated more than approximately 0.75% of an oil soluble metallic naphthenate and a small amount of a free organic acid selected from the group consisting of oleic acids and stearic acids, the proportion of said naphthenate being insufficient to cause substantial jell formation in the presence of the free acid.

2. A lubricant comprising a mineral oil in which has been incorporated more than approximately 0.75% of an oil soluble metallic naphthenate selected from the group consisting of aluminum, zinc, magnesium, cobalt, cadmium, manganese and tin naphthenates, and a small amount of a free organic carboxylic acid selected from the group consisting of oleic acids and stearic acids, the amount of said free acid being greater than approximately 0.1% but insufficient to render the oil unduly corrosive to metal parts to be lubricated, and the proportion of said naphthenate being insufficient to cause substantial jell formation in the presence of the free acid.

3. A lubricant comprising a mineral oil containing more than approximately 0.75% of an oil soluble metal naphthenate and a small amount of an oil soluble higher fatty acid, the proportion of said naphthenate being insufficient to cause substantial jell formation in the presence of the fatty acid.

4. A compounded lubricating oil of liquid non-jelling consistency comprising a mineral oil and more than approximately 0.75% of an oil soluble aluminum naphthenic acid salt comprising insufficient naphthenic acid to satisfy the normal valence of the aluminum, and a small amount of a free organic carboxylic acid selected from the group consisting of oleic acids and stearic acids, said aluminum salt being present in an amount insufficient to cause substantial jell formation in the presence of the fatty acid.

5. A lubricant comprising a mineral oil containing more than approximately 0.75% of magnesium naphthenate and a small amount of an oil soluble higher fatty acid, the proportion of said naphthenate being insufficient to cause substantial jell formation in the presence of the fatty acid.

6. A compounded lubricating oil of liquid non-jelling consistency comprising a mineral oil, an oil soluble aluminum naphthenic acid salt comprising insufficient naphthenic acid to satisfy the normal valence of the aluminum, said aluminum salt being present in the oil in an amount sufficient to normally impart a jelling tendency to said oil, and a higher fatty acid in an amount sufficient to inhibit said jelling tendency.

GEORGE L. NEELY.
FRANK W. KAVANAGH.